United States Patent
Komatsu et al.

(10) Patent No.: US 12,529,144 B2
(45) Date of Patent: *Jan. 20, 2026

(54) COMPOSITION, METHOD OF PRODUCING SUBSTRATE, AND POLYMER

(71) Applicant: JSR CORPORATION, Tokyo (JP)

(72) Inventors: Hiroyuki Komatsu, Tokyo (JP); Motohiro Shiratani, Tokyo (JP)

(73) Assignee: JSR CORPORATION, Tokyo (JP)

( * ) Notice: Subject to any disclaimer, the term of this patent is extended or adjusted under 35 U.S.C. 154(b) by 864 days.

This patent is subject to a terminal disclaimer.

(21) Appl. No.: 17/735,151

(22) Filed: May 3, 2022

(65) Prior Publication Data

US 2022/0259741 A1    Aug. 18, 2022

Related U.S. Application Data

(63) Continuation of application No. PCT/JP2020/042071, filed on Nov. 11, 2020.

(30) Foreign Application Priority Data

Nov. 12, 2019 (JP) .................. 2019-205088

(51) Int. Cl.
  *C23C 18/06* (2006.01)
  *C09D 5/20* (2006.01)
  (Continued)

(52) U.S. Cl.
  CPC ............... *C23C 18/06* (2013.01); *C09D 5/20* (2013.01); *C09D 185/02* (2013.01);
  (Continued)

(58) Field of Classification Search
  CPC ......... C08L 25/04; C23C 18/00; C23C 18/06; C08F 8/00; C08F 8/40; C08F 2810/40
  See application file for complete search history.

(56) References Cited

U.S. PATENT DOCUMENTS 4,978,723 A * 12/1990 Hertler ............... C08F 8/40
                                                    525/330.3
5,466,748 A * 11/1995 Ikeda ................. C08L 23/06
                                                    525/61
(Continued)

FOREIGN PATENT DOCUMENTS

JP    2003076036 A    3/2003
JP    2007538381 A    12/2007
(Continued)

OTHER PUBLICATIONS

JP-2015-096932-A; May 21, 2015; machine translation. (Year: 2015).*

(Continued)

*Primary Examiner* — Rip A Lee
(74) *Attorney, Agent, or Firm* — Element IP, PLC

(57) ABSTRACT

A composition includes a polymer and a solvent. The polymer includes a group (X) which is at least one selected from the group consisting of: a group including at least two cyano groups; a group including —B(OR)$_2$; a group including —PO(OR)$_2$; and a group including —P(OR)$_2$. Each R independently represents a hydrogen atom or a monovalent hydrocarbon group having 1 to 10 carbon atoms. The polymer preferably includes the group (X) at an end of a main chain thereof or at an end of a side chain thereof.

9 Claims, 1 Drawing Sheet

(51) Int. Cl.
    *C09D 185/02*     (2006.01)
    *C09D 185/04*     (2006.01)
    *C23C 18/12*     (2006.01)
    *C23G 1/02*     (2006.01)
    *C08F 8/00*     (2006.01)
    *C08F 8/40*     (2006.01)

(52) U.S. Cl.
    CPC ........ *C09D 185/04* (2013.01); *C23C 18/1216* (2013.01); *C23C 18/1291* (2013.01); *C23C 18/1295* (2013.01); *C23G 1/02* (2013.01); *C08F 8/00* (2013.01); *C08F 8/40* (2013.01); *C08F 2810/40* (2013.01)

(56) References Cited

U.S. PATENT DOCUMENTS

| | | | | |
|---|---|---|---|---|
| 5,604,291 | A * | 2/1997 | Kerr | C08F 8/40 526/278 |
| 7,098,525 | B2 * | 8/2006 | Bai | H10K 10/471 257/532 |
| 8,405,069 | B2 * | 3/2013 | Kippelen | H10K 10/478 257/E51.001 |
| 11,270,883 | B2 * | 3/2022 | Komatsu | C09D 129/00 |
| 11,426,761 | B2 * | 8/2022 | Komatsu | C08F 8/42 |
| 12,286,503 | B2 * | 4/2025 | Jeong | C07F 9/304 |
| 2004/0026671 | A1 * | 2/2004 | Van den Bergen | C09D 175/16 252/601 |
| 2013/0157926 | A1 * | 6/2013 | Engbersen | C08L 79/02 528/7 |
| 2015/0315324 | A1 * | 11/2015 | Uenishi | C08F 8/42 525/332.9 |
| 2023/0128690 | A1 * | 4/2023 | Iwachi | C08C 19/04 525/374 |
| 2023/0331878 | A1 * | 10/2023 | Inatomi | C08F 136/08 |

FOREIGN PATENT DOCUMENTS

| | | | | |
|---|---|---|---|---|
| JP | 2010212212 | * | 9/2010 | ............ H01G 11/48 |
| JP | 2014063045 | A | 4/2014 | |
| JP | 2015-096932 | A * | 5/2015 | ............ C08F 30/02 |
| JP | 2016025315 | A | 2/2016 | |
| JP | 2016025355 | A | 2/2016 | |
| WO | WO-2019031114 | A1 * | 2/2019 | ............ C08L 101/06 |

OTHER PUBLICATIONS

WO-2019031114-A1; Feb. 14, 2019; machine translation. (Year: 2019).*

Atsushi Hozumi et al, "Preparation of a Well-Defined Amino-Terminated Self-Assembled Monolayer and Copper Microlines on a Polyimide Substrate Covered with an Oxide Nanoskin", Langmuir, 21, 2005, pp. 8234-8242.

Fatemeh Sadat Minaye Hashemi et al, "Self-Correcting Process for High Quality Patterning by Atomic Layer Deposition", ACS NANO, vol. 9, No. 9, 2015, pp. 8710,8717.

Haeshin Lee et al, "Mussel-Inspired Surface Chemistry for Multifunctional Coatings", Science, 318(5849), 2007, 10 pages.

International Search Report issued Feb. 2, 2021 in PCT/JP2020/042071 (with English translation), 6 pages.

Ming Fang et al, "Area-Selective Atomic Layer Deposition: Conformal Coating, Subnanometer Thickness Control, and Smart Positioning", ACS NANO, vol. 9, No. 9, 2015, pp. 8651-8654.

Written Opinion issued Feb. 2, 2021 in PCT/JP2020/042071 (with English translation), 7 pages.

Office Action issued Aug. 6, 2024 in corresponding Japanese Patent Application No. 2021-556121 (with machine English translation), 8 pages.

* cited by examiner

Baking: 150 ° C, 3 min
Rinsing: PGMEA

COMPOSITION, METHOD OF PRODUCING SUBSTRATE, AND POLYMER

CROSS-REFERENCE TO RELATED APPLICATIONS

The present application is a continuation application of International Application No. PCT/JP2020/042071, filed Nov. 11, 2020, which claims priority to Japanese Patent Application No. 2019-205088, filed Nov. 12, 2019. The contents of these applications are incorporated herein by reference in their entirety.

BACKGROUND OF THE INVENTION

Field of the Invention

The present invention relates to a composition, a method of producing a substrate, and a polymer.

Description of the Related Art

Further microfabrication of semiconductor devices has been accompanied by a demand for a technique of forming a fine pattern having a line width of less than 30 nm. However, optical factors and the like have led to technical difficulties for conventional methods employing lithography.

Therefore, a bottom-up technique, as generally referred to, has been contemplated for forming a fine pattern. As the bottom-up technique, in addition to a method employing directed self-assembly of a polymer, a method for selectively modifying a base material having a surface layer that includes fine regions has been recently studied. Such a method for selective modification requires a material enabling convenient and highly selective modification of surface regions, and various materials have been investigated for such use (see Japanese Unexamined Patent Application, Publication No. 2016-25355; Japanese Unexamined Patent Application, Publication No. 2003-76036; ACS Nano, 9, 9, 8710, 2015; ACS Nano, 9, 9, 8651, 2015; Science, 318, 426, 2007; and Langmuir, 21, 8234, 2005).

SUMMARY OF THE INVENTION

According to an aspect of the present invention, a composition includes a polymer and a solvent. The polymer includes a group (X) which is at least one selected from the group consisting of: a group including at least two cyano groups; a group including $-B(OR)_2$; a group including $-PO(OR)_2$; and a group including $-P(OR)_2$. Each R independently represents a hydrogen atom or a monovalent hydrocarbon group having 1 to 10 carbon atoms.

According to another aspect of the present invention, a method of producing a substrate, includes applying a composition directly or indirectly on a base material to form a coating film, and heating the coating film. The composition includes a polymer and a solvent. The polymer includes a group (X) which is at least one selected from the group consisting of: a group including at least two cyano groups; a group including $-B(OR)_2$; a group including $-PO(OR)_2$; and a group including $-P(OR)_2$. Each R independently represents a hydrogen atom or a monovalent hydrocarbon group having 1 to 10 carbon atoms.

According to a further aspect of the present invention, a polymer includes, at an end of a main chain or at an end of a side chain thereof, a group (X) which is at least one selected from the group consisting of: a group including at least two cyano groups; a group including $-B(OR)_2$; a group including $-PO(OR)_2$; and a group including $-P(OR)_2$. Each R independently represents a hydrogen atom or a monovalent hydrocarbon group having 1 to 10 carbon atoms.

DESCRIPTION OF EMBODIMENTS

Figure 1:
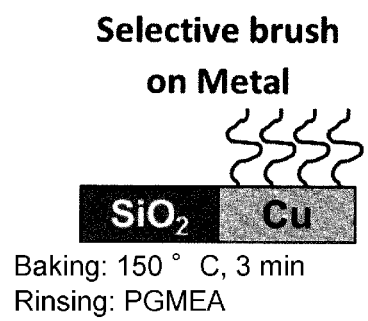
FIG. 1 is a schematic view illustrating regionally selective chemical modification of a surface of a base material containing a metal atom in/on at least a part of a surface layer thereof, by using the composition of one embodiment of the present invention.

Recently, surfaces of base materials have been subjected to pattern deposition through metal oxide formation using an ALD (Atomic Layer Deposition) process or a CVD (Chemical Vapor Deposition) process, and thus the deposition of the pattern in a highly selective manner with discrimination of the regions is required. On the other hand, there is also a requirement to enable removing by wet detachment, chemical modification which had been performed on the surface of a base material, in a convenient manner with influences on the base material being diminished.

According to one embodiment of the invention, a composition contains: a polymer (hereinafter, may be also referred to as "(A) polymer" or "polymer (A)") having at least one type of a first group (hereinafter, may be also referred to as "group (X)") selected from a set consisting of a group including at least two cyano groups, a group including $-B(OR)_2$, a group including $-PO(OR)_2$, and a group including $-P(OR)_2$ (wherein, each R independently represents a hydrogen atom or a monovalent hydrocarbon group having 1 to 10 carbon atoms); and a solvent (hereinafter, may be also referred to as "(B) solvent" or "solvent (B)").

According to another embodiment of the present invention, a method of producing a substrate includes: applying the composition of the one embodiment directly or indirectly on a base material (hereinafter, may be also referred to as "base material (S)") containing a metal atom (hereinafter, may be also referred to as "metal atom (M)") in/on at least a part of a surface layer thereof; and heating a coating film formed by the applying.

According to still another embodiment of the present invention, a polymer has, at an end of a main chain or at an end of a side chain thereof, at least one type of group selected from a set consisting of a group including at least two cyano groups, a group including $-B(OR)_2$, a group including $-PO(OR)_2$, and a group including $-P(OR)_2$ (wherein, each R independently represents a hydrogen atom or a monovalent hydrocarbon group having 1 to 10 carbon atoms).

The composition and the method of producing a substrate according to the embodiments of the present invention enable forming of a film which is wet detachable, in a regionally selective manner with high density, on a surface of a base material containing a metal atom in/on at least a part of a surface layer thereof, the film being capable of achieving superior blocking performance against metal oxide formation by an ALD process or a CVD process. The polymer according to the still another embodiment of the present invention can be suitably used as a polymer component of the composition of the one embodiment of the present invention. Therefore, the composition, the method of producing a substrate, and the polymer of the embodiments of the present invention can be suitably used for working processes of semiconductor devices, and the like, in which microfabrication is expected to be further in progress hereafter.

Hereinafter, the embodiments will be described in detail.

Composition

The composition of the one embodiment of the present invention contains the polymer (A) and the solvent (B). The composition may contain optional component(s), within a range not leading to impairment of the effects of the present invention.

Figure 2:
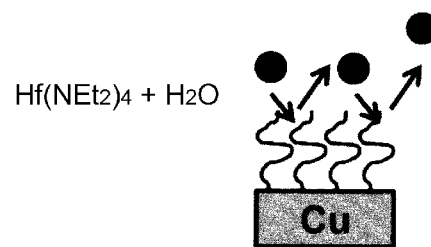
FIG. 2 is a schematic view illustrating blocking performance against metal oxide formation by an ALD process.

Due to containing the polymer (A) and the solvent (B), and to the polymer (A) having the group (X), the composition enables forming of a film which is wet detachable, in a regionally selective manner with high density, on a surface of a base material containing a metal atom in/on at least a part of a surface layer thereof, the film being capable of achieving superior blocking performance against metal oxide formation by an ALD process or a CVD process. Although not necessarily clarified and without wishing to be bound by any theory, the reason for achieving the aforementioned effects by the composition due to involving such a constitution may be presumed, for example, as in the following. Due to the polymer (A) having the group (X) which is capable of bonding to the metal atom (M), it is considered that a chemically modified film can be formed in a regionally selective manner on the surface of the base material (S) containing the metal atom (M) in/on at least a part of the surface layer thereof, as shown in FIG. 1, and that this film is wet detachable by using an acid-containing liquid or the like. Furthermore, it is considered that as shown in FIG. 2, by using such a film, blocking performance against metal oxide formation by an ALD process or a CVD process can be further improved.

Hereinafter, each component contained in the composition will be described.

(A) Polymer

The polymer (A) is a polymer having the group (X). A structural unit constituting the polymer (A) is exemplified by: a structural unit derived from substituted or unsubstituted styrene; a structural unit derived from (meth)acrylic acid or a (meth)acrylic acid ester; a structural unit derived from substituted or unsubstituted ethylene; a structural unit which includes a crosslinkable group; and the like. The polymer (A) may have one, or two or more types of each of these structural units. The "crosslinkable group" as referred to herein means a group capable of forming a cross-linked structure through a reaction under heating conditions, under conditions involving radiation with an active energy ray, under acidic conditions, or the like.

Examples of a monomer that gives the structural unit derived from substituted or unsubstituted styrene include styrene, α-methylstyrene, o-methylstyrene, m-methylstyrene, p-methylstyrene, p-t-butyl styrene, 2,4,6-trimethylstyrene, p-methoxystyrene, p-t-butoxystyrene, o-vinylstyrene, m-vinylstyrene, p-vinylstyrene, o-hydroxystyrene, m-hydroxystyrene, p-hydroxystyrene, m-chloromethyl styrene, p-chloromethyl styrene, p-chlorostyrene, p-bromostyrene, p-iodostyrene, p-nitrostyrene, p-cyanostyrene, and the like.

Examples of a monomer that gives the structural unit derived from a (meth)acrylic acid ester include:

(meth)acrylic acid alkyl esters such as methyl (meth)acrylate, ethyl (meth)acrylate, t-butyl (meth)acrylate, and 2-ethylhexyl (meth)acrylate;

(meth)acrylic acid cycloalkyl esters such as cyclopentyl (meth)acrylate, cyclohexyl (meth)acrylate, 1-methylcyclopentyl (meth)acrylate, 2-ethyladamantyl (meth)acrylate, and 2-(adamantan-1-yl)propyl (meth)acrylate;

(meth)acrylic acid aryl esters such as phenyl (meth)acrylate and naphthyl (meth)acrylate;

(meth)acrylic acid-substituted alkyl esters such as 2-hydroxyethyl (meth)acrylate, 3-hydroxyadamantyl (meth)acrylate, 3-glycidylpropyl (meth)acrylate, and 3-trimethylsilylpropyl (meth)acrylate; and the like.

Examples of a monomer that gives the structural unit derived from substituted or unsubstituted ethylene include:

ethylene;

alkenes such as propene, butene, and pentene;

vinylcycloalkanes such as vinylcyclopentane and vinylcyclohexane;

cycloalkenes such as cyclopentene and cyclohexene;

4-hydroxy-1-butene; vinyl glycidyl ether; vinyl trimethyl silyl ether; and the like.

Examples of the crosslinkable group include:

polymerizable carbon-carbon double bond-containing groups such as a vinyl group, a vinyloxy group, an allyl group, a (meth)acryloyl group, and a styryl group;

cyclic ether groups such as an oxiranyl group, an oxiranyloxy group, an oxetanyl group, and an oxetanyloxy group;

cyclobutane ring-fused aryl groups such as a cyclobutane ring-fused phenyl group and a cyclobutane ring-fused naphthyl group;

aryl groups bonded to an aromatic hydroxy group protected with an acyl group or a heat-labile group, such as an acetoxyphenyl group and a t-butoxyphenyl group;

aryl groups bonded to a methylol group (—$CH_2OH$) protected with an acyl group or a heat-labile group, such as an acetoxymethylphenyl group and a methoxymethylphenyl group;

aryl groups bonded to a substituted or unsubstituted sulfanylmethyl group (—$CH_2SH$), such as a sulfanylmethylphenyl group and a methylsulfanylmethylphenyl group; and the like.

The cyclobutane ring-fused aryl groups form a covalent bond with one another under heating conditions.

The "acyl group" as referred to herein is a group obtained by removing OH from a carboxylic acid, and means a group that protects an aromatic hydroxy group or a methylol group by substituting for a hydrogen atom. The "heat-labile group" as referred to herein is a group that substitutes for a hydrogen atom of an aromatic hydroxy group, a methylol group, or a sulfanylmethyl group, and means a group that dissociates by heating.

Examples of the acyl group in the aryl group bonded to an aromatic hydroxy group, a methylol group or a sulfanylmethyl group, each being protected, include a formyl group, an acetyl group, a propionyl group, a butyryl group, a benzoyl group, and the like.

Examples of the heat-labile group in the aryl group bonded to a protected aromatic hydroxy group include tertiary alkyl groups such as a t-butyl group and a t-amyl group, and the like. Examples of the heat-labile group in the aryl group bonded to a methylol group or a sulfanylmethyl group, each being protected include alkyl groups such as a methyl group, an ethyl group and a propyl group, and the like.

Examples of the structural unit that includes the crosslinkable group include a structural unit derived from a vinyl compound having a crosslinkable group, a structural unit derived from a (meth)acryl compound having a crosslinkable group, and the like.

Group (X)

The group (X) is at least one type of a group selected from the set consisting of: a group including at least two cyano groups; a group including —B(OR)$_2$; a group including —PO(OR)$_2$; and a group including —P(OR)$_2$ (wherein, each R independently represents a hydrogen atom or a monovalent hydrocarbon group having 1 to 10 carbon atoms). As a result of further improving substrate selectivity due to including a plurality of polar groups, the group (X) enables forming of a chemically modified film, in a more regionally selective manner, on the surface of the base material (S) containing the metal atom (M) in/on at least a part of the surface layer thereof.

The group (X) is capable of bonding to the metal atom (M). The bond is exemplified by chemical bonds, and examples thereof include a covalent bond, an ionic bond, a coordinate bond, and the like. Of these, in light of greater bonding strength between the metal atom (M) and the group (X), the coordinate bond is preferred.

Examples of the group including at least two cyano groups include a group including —CH=C(CN)$_2$, a group including —CH(CN)$_2$, and the like.

Examples of the group including —CH=C(CN)$_2$ include *—CH=C(CN)$_2$, *—R'—CH=C(CN)$_2$, and the like, wherein R' represents an alkanediyl group having 1 to 20 carbon atoms; and * denotes a binding site to the polymer (A).

Examples of the group including —CH(CN)$_2$ include *—CH(CN)$_2$, *—R'—CH(CN)$_2$, and the like, wherein R' represents an alkanediyl group having 1 to 20 carbon atoms; and * denotes a binding site to the polymer (A).

Examples of the group including —B(OH)$_2$ include *—B(OH)$_2$, *—R'—B(OH)$_2$, and the like, wherein: R represents a hydrogen atom or a monovalent hydrocarbon group having 1 to 10 carbon atoms; R' represents an alkanediyl group having 1 to 20 carbon atoms; and * denotes a binding site to the polymer (A).

Examples of the group including —PO(OR)$_2$ include *—PO(OR)$_2$, *—R'—PO(OR)$_2$, and the like, wherein: R represents a hydrogen atom or a monovalent hydrocarbon group having 1 to 10 carbon atoms; R' represents an alkanediyl group having 1 to 20 carbon atoms; and * denotes a binding site to the polymer (A).

Examples of the group including —P(OR)$_2$ include *—P(OR)$_2$, *—R'—P(OR)$_2$, and the like, wherein: R represents a hydrogen atom or a monovalent hydrocarbon group having 1 to 10 carbon atoms, R' represents an alkanediyl group having 1 to 20 carbon atoms; and * denotes a binding site to the polymer (A).

The "hydrocarbon group" as referred to herein may be exemplified by a chain hydrocarbon group, an alicyclic hydrocarbon group, and an aromatic hydrocarbon group. The "hydrocarbon group" may be either a saturated hydrocarbon group or an unsaturated hydrocarbon group. The "chain hydrocarbon group" as referred to herein means a hydrocarbon group not including a cyclic structure but being constituted with only a chain structure, and may be exemplified by both a linear hydrocarbon group and a branched hydrocarbon group. The "alicyclic hydrocarbon group" as referred to herein means a hydrocarbon group that includes, as a ring structure, not an aromatic ring structure but an alicyclic structure alone, and may be exemplified by both a monocyclic alicyclic hydrocarbon group and a polycyclic alicyclic hydrocarbon group. With regard to this, it is not necessary for the alicyclic hydrocarbon group to be constituted with only an alicyclic structure, and a part thereof may include a chain structure. The "aromatic hydrocarbon group" as referred to herein means a hydrocarbon group that includes an aromatic ring structure as a ring structure. With regard to this, it is not necessary for the aromatic hydrocarbon group to be constituted with only an aromatic ring structure, and a part thereof may include a chain structure and/or an alicyclic structure.

The monovalent hydrocarbon group having 1 to 10 carbon atoms which may be represented by R is exemplified by a monovalent chain hydrocarbon group having 1 to 10 carbon atoms, a monovalent alicyclic hydrocarbon group having 3 to 10 carbon atoms, a monovalent aromatic hydrocarbon group having 6 to 10 carbon atoms, and the like.

Examples of the monovalent chain hydrocarbon group having 1 to 10 carbon atoms include:

alkyl groups such as a methyl group, an ethyl group, an n-propyl group, an iso-propyl group, an n-butyl group, a sec-butyl group, an iso-butyl group, and a tert-butyl group;

alkenyl groups such as an ethenyl group, a propenyl group, and a butenyl group;

alkynyl groups such as an ethynyl group, a propynyl group, and a butynyl group; and the like.

Examples of the monovalent alicyclic hydrocarbon group having 3 to 10 carbon atoms include:

alicyclic saturated hydrocarbon groups such as a cyclopentyl group, a cyclohexyl group, a norbornyl group, and an adamantyl group;

alicyclic unsaturated hydrocarbon groups such as a cyclopentenyl group, a cyclohexenyl group, and a norbornenyl group; and the like.

Examples of the monovalent aromatic hydrocarbon group having 6 to 10 carbon atoms include:

aryl groups such as a phenyl group, a tolyl group, a xylyl group, and a naphthyl group;

aralkyl groups such as a benzyl group and a phenethyl group; and the like.

R represents preferably a hydrogen atom, the chain hydrocarbon group, or the aromatic hydrocarbon group, more preferably a hydrogen atom or the chain hydrocarbon group, still more preferably a hydrogen atom or the alkyl group, and particularly preferably a hydrogen atom.

Of these, in light of enhancement of regional selectivity of the chemical modification, the group (X) is preferably the group including at least two cyano groups, the group including —B(OR)$_2$, or the group including —PO(OR)$_2$, and more preferably the group including at least two cyano groups, the group including —B(OH)$_2$, or the group including —PO(OH)$_2$.

It is preferred that the polymer (A) has the group (X) at an end of a main chain or at an end of a side chain thereof. The "main chain" as referred to means the longest atom chain among the atom chains constituting the polymer (A). The "side chain" as referred to means, among the atom chains constituting the polymer (A), an atom chain other than the main chain.

The group (X) at the end of the main chain can be introduced by, for example, treating a polymerization end of living anionic polymerization or the like, with an end-treatment agent that gives the group (X).

Examples of the end-treatment agent that gives the group (X) include N,N-dimethylformamide, diisopropylbromoethylborate, diethyl chlorophosphate, and the like.

The group including at least two cyano groups can be formed by, for example, allowing a group formed by using N,N-dimethylformamide to react with malononitrile. The group including —B(OH)$_2$ can be formed by, for example, using diisopropylbromomethylborate. The group including —PO(OH)$_2$ can be formed by hydrolyzing in the presence of, for example, a base such as triethylamine, in a solvent such as propylene glycol monomethyl ether, for example, a group formed by using diethyl chlorophosphate.

The polymer (A) having the group (X) at the end of the side chain thereof can be formed by, for example, using as a monomer, a monomer having, e.g., the group (X) at the end thereof, and having an ethylenic carbon-carbon double bond.

In light of an improvement of the regional selectivity of the chemical modification, the polymer (A) preferably has the group (X) at the end(s) of the main chain, and more preferably has the group (X) at one end of the main chain.

The lower limit of a polystyrene equivalent weight average molecular weight (Mw) of the polymer (A) as determined by gel permeation chromatography (GPC) is preferably 1,000, more preferably 2,000, still more preferably 4,000, and particularly preferably 4,500. The upper limit of the Mw is preferably 50,000, more preferably 30,000, still more preferably 15,000, and particularly preferably 8,000.

The upper limit of a ratio (Mw/Mn, dispersity index) of the Mw to a polystyrene equivalent number average molecular weight (Mn) of the polymer (A), as determined by GPC, is preferably 5, more preferably 2, still more preferably 1.5, and particularly preferably 1.3. The lower limit of the ratio is typically 1, and preferably 1.05.

The Mw and Mn of the polymer as referred to herein are values each measured by gel permeation chromatography under the following conditions using GPC columns ("G2000 HXL"×2, "G3000 HXL"×1, and "G4000 HXL"×1) available from Tosoh Corporation.
 eluent: tetrahydrofuran (FUJIFILM Wako Pure Chemical Corporation)
 flow rate: 1.0 mL/min
 sample concentration: 1.0% by mass
 amount of injected sample: 100 µL
 column temperature: 40° C.
 detector: differential refractometer
 standard substance: mono-dispersed polystyrene The lower limit of a proportion of the polymer (A) with respect to total components other than the solvent (B) in the composition is preferably 80% by mass, more preferably 90% by mass, and still more preferably 95% by mass. The upper limit of the proportion is, for example, 100% by mass.

(B) Solvent

The solvent (B) is not particularly limited as long as it is a solvent capable of dissolving or dispersing at least the polymer (A) and the other component(s).

The solvent (B) is exemplified by alcohol solvents, ether solvents, ketone solvents, amide solvents, ester solvents, hydrocarbon solvents, and the like.

Examples of the alcohol solvents include:
 aliphatic monohydric alcohol solvents having 1 to 18 carbon atoms such as 4-methyl-2-pentanol and n-hexanol;
 alicyclic monohydric alcohol solvents having 3 to 18 carbon atoms such as cyclohexanol;
 polyhydric alcohol solvents having 2 to 18 carbon atoms such as 1,2-propylene glycol;
 polyhydric alcohol partial ether solvents having 3 to 19 carbon atoms such as propylene glycol monomethyl ether; and the like.

Examples of the ether solvents include:
 dialkyl ether solvents such as diethyl ether, dipropyl ether, dibutyl ether, dipentyl ether, diisoamyl ether, dihexyl ether and diheptyl ether;
 cyclic ether solvents such as tetrahydrofuran and tetrahydropyran;
 aromatic ring-containing ether solvents such as diphenyl ether and anisole (methyl phenyl ether); and the like.

Examples of the ketone solvents include:
 chain ketone solvents such as acetone, methyl ethyl ketone, methyl n-propyl ketone, methyl n-butyl ketone, diethyl ketone, methyl iso-butyl ketone (MIBK), 2-heptanone (methyl n-pentyl ketone), ethyl n-butyl ketone, methyl n-hexyl ketone, di-iso-butyl ketone, and trimethylnonanone;
 cyclic ketone solvents such as cyclopentanone, cyclohexanone, cycloheptanone, cyclooctanone, and methylcyclohexanone;
 2,4-pentanedione, acetonylacetone, and acetophenone; and the like.

Examples of the amide solvents include:
 cyclic amide solvents such as N,N'-dimethylimidazolidinone and N-methylpyrrolidone;
 chain amide solvents such as N-methylformamide, N,N-dimethylformamide, N,N-diethylformamide, acetamide, N-methylacetamide, N,N-dimethylacetamide and N-methylpropionamide; and the like.

Examples of the ester solvents include:
 monocarboxylic acid ester solvents such as n-butyl acetate and ethyl lactate;
 polyhydric alcohol carboxylate solvents such as propylene glycol acetate;
 polyhydric alcohol partial ether carboxylate solvents such as propylene glycol monomethyl ether acetate;
 lactone solvents such as γ-butyrolactone and δ-valerolactone;
 polyhydric carboxylic acid diester solvents such as diethyl oxalate;
 carbonate solvents such as dimethyl carbonate, diethyl carbonate, ethylene carbonate, and propylene carbonate; and the like.

Examples of the hydrocarbon solvents include:
 aliphatic hydrocarbon solvents having 5 to 12 carbon atoms such as n-pentane and n-hexane;
 aromatic hydrocarbon solvents having 6 to 16 carbon atoms such as toluene and xylene; and the like.

Of these, the ester solvents are preferred, the polyhydric alcohol partial ether carboxylate solvents are more preferred, and propylene glycol monomethyl ether acetate is still more preferred. The composition of the one embodiment of the present invention may contain one, or two or more types of the solvent (B).

Optional Component(s)

The composition may contain as optional component(s), an acid generating agent, a surfactant, and/or the like.

Acid Generating Agent

The acid generating agent is a compound that is capable of generating an acid by heating or irradiation with an active energy ray. The acid generating agent is exemplified by ionic compounds, nonionic compounds, and the like.

Examples of ionic acid generating agents include salts of:
 a cation such as triphenyl sulfonium, 1-dimethylthionaphthalene, 1-dimethylthio-4-hydroxynaphthalene, 1-dimethylthio-4,7-dihydroxynaphthalene, 4-hydroxyphenyldimethyl sulfonium, benzyl-4-hydroxyphenylmethyl sulfonium, 2-methylbenzyl-4-hydroxyphenylmethyl sulfonium, 2-methylbenzyl-4- acetylphenylmethyl sulfonium, 2-methylbenzyl-4-benzoyloxyphenylmethyl sulfonium, 1-(4-n-butoxynaphthalen-1-yl) tetrahydrothiophenium, 1-(4,7-dibutoxy-1-naphthalenyl) tetrahydrothiophenium, diphenyl iodonium or di(t-butylphenyl) iodonium; with an anion e.g., a sulfonate ion which may be methanesulfonate, trifluoromethanesulfonate, a fluorinated alkyl sulfonate such as nonafluorobutanesulfonate, camphorsulfonate, a p-toluenesulfonic acid ion or the like; or a phosphoric acid ion such as a hexafluorophosphoric acid ion, a boric acid ion such as a tetrafluoroboric acid ion, an antimonic acid ion such as a hexafluoroantimonic acid ion, or the like. Of these, the salts of the triphenylsulfonium cation with the fluorinated alkyl sulfonate ion are preferred, and triphenylsulfonium nonafluorobutane-1-sulfonate is more preferred.

Nonionic acid generating agents are exemplified by halogen-containing compounds, diazomethane compounds, sulfone compounds, sulfonic acid ester compounds, carboxylic acid ester compounds, phosphoric acid ester compounds, N-sulfonyloxyimide compounds, sulfonebenzotriazole compounds, and the like.

Examples of the N-sulfonyloxyimide compounds include N-(trifluoromethylsulfonyloxy)succinimide, N-(2-trifluoromethylphenyl sulfonyloxy)phthalimide, and the like.

In the case of the composition containing the acid generating agent, the lower limit of a content of the acid generating agent with respect to 100 parts by mass of the polymer (A) is preferably 0.1 parts by mass, more preferably 0.5 parts by mass, still more preferably 1 part by mass, and particularly preferably 2 parts by mass. The upper limit of the content is preferably 50 parts by mass, more preferably 30 parts by mass, still more preferably 10 parts by mass, and particularly preferably 6 parts by mass.

Method of Preparing Composition

The composition of the one embodiment of the present invention may be prepared by, for example, mixing the polymer (A), the solvent (B), and as needed the optional component(s) at a predetermined ratio, and preferably filtering the resulting mixture through a high-density polyethylene filter, etc., having fine pores of no greater than 0.45 µm. The lower limit of the solid content concentration of the composition is preferably 0.1% by mass, more preferably 0.5% by mass, and still more preferably 0.7% by mass. The upper limit of the solid content concentration is preferably 30% by mass, more preferably 10% by mass, and still more preferably 3% by mass. The "solid content concentration" as referred to herein means the concentration (% by mass) of the total components other than the solvent (B) in the composition.

Method of Producing Substrate

The method of producing a substrate of another embodiment of the present invention includes steps of: applying a composition directly or indirectly on a base material containing a metal atom in/on at least a part of a surface layer thereof (hereinafter, may be also referred to as "applying step"); and heating a coating film formed by the applying step (hereinafter, may be also referred to as "heating step"). In the method of producing a substrate, the composition of the one embodiment of the present invention described above is used as the composition.

Due to the composition of the one embodiment of the present invention being used, the method of producing a substrate enables forming of a film which is wet detachable, in a regionally selective manner with high density, on a surface of a base material containing a metal atom in/on at least a part of a surface layer thereof, the film being capable of achieving superior blocking performance against metal oxide formation by an ALD process or a CVD process.

The method of producing a substrate may include after the heating step, a step of removing with a rinse agent, a portion formed on the region (II) described later, of the coating film after the heating step (hereinafter, may be also referred to as "rinsing step").

The method of producing a substrate may include after the rinsing step, a step of depositing a pattern on the surface of the base material (S) after the rinsing step, by a CVD process or an ALD process (hereinafter, may be also referred to as "depositing step").

In addition, the method of producing a substrate may include after the heating step, a step of bringing a removing liquid into contact with a film formed by the heating step (hereinafter, may be also referred to as "removing step"). Accordingly, wet detachment of the film formed is enabled.

Each step will be described below.

Applying Step

In this step, the composition of the one embodiment of the present invention is applied directly or indirectly on the base material (S) containing a metal atom in/on at least a part of the surface layer thereof. Accordingly, a coating film is formed on the base material (S) directly or via another layer.

Base Material

The base material (S) contains the metal atom (M) in/on at least a part of the surface layer thereof.

The metal atom (M) is not particularly limited as long as it is an atom of a metal element. It is to be noted that a silicon atom is a nonmetal atom, and does not fall under the category of the metal atom. Examples of the metal atom (M) include atoms of copper, iron, zinc, cobalt, aluminum, tin, tungsten, zirconium, titanium, tantalum, germanium, molybdenum, ruthenium, gold, silver, platinum, palladium, nickel, and the like. Of these, copper, cobalt, or tungsten is preferred.

The metal atom (M) in/on at least a part of the surface layer may be included in the form of, for example, a metal simple substance, an alloy, an electrically conductive nitride, a metal oxide, a silicide, or the like.

Examples of the metal simple substance include simple substances of metals such as copper, iron, cobalt, tungsten, tantalum, and the like.

Examples of the alloy include a nickel-copper alloy, a cobalt-nickel alloy, a gold-silver alloy, and the like.

Examples of the electrically conductive nitride include tantalum nitride, titanium nitride, iron nitride, aluminum nitride, and the like.

Examples of the metal oxide include tantalum oxide, aluminum oxide, iron oxide, copper oxide, and the like.

Examples of the silicide include iron silicide, molybdenum silicide, and the like.

Of these, the metal simple substance, the alloy, the electrically conductive nitride, or the silicide is preferred, the metal simple substance or the electrically conductive nitride is more preferred, a copper simple substance, a cobalt simple substance, a tungsten simple substance, a tantalum simple substance, titanium nitride, or tantalum nitride is still more preferred, and a copper simple substance, a cobalt simple substance, or a tungsten simple substance is particularly preferred.

The base material (S) preferably has: a region (hereinafter, may be also referred to as "region (I)") containing the metal atom (M) in/on the surface layer thereof and a region (hereinafter, may be also referred to as "region (II)") not containing the metal atom (M) in/on the surface layer thereof. It is preferred that the region (II) substantially consists of only a nonmetal atom (hereinafter, may be also referred to as "nonmetal atom (N)"). In the case of the base material (S) having both the region (I) and the region (II), selective chemical modification of the surface of the region (I) containing the metal atom (M) in/on the surface layer thereof is enabled.

In the region (II), the nonmetal atom (N) may be included in the form of, for example, a nonmetal simple substance, a nonmetal oxide, a nonmetal nitride, a nonmetal oxidenitride, and the like.

Examples of the nonmetal simple substance include simple substances of silicon, carbon, etc., and the like.

Examples of the nonmetal oxide include silicon oxide and the like.

Examples of the nonmetal nitride include SiNx, $Si_3N_4$, and the like.

Examples of the nonmetal oxidenitride include SiON and the like.

Of these, the nonmetal oxide is preferred, and silicon oxide is more preferred.

A mode of the arrangement of the region (I) and the region (II) in/on the base material (S) is not particularly limited, and is exemplified by surficial, spotted, striped, and other shapes in a planar view. The sizes of the region (I) and the region (II) are not particularly limited, and regions having a desired size may be provided as appropriate.

The shape of the base material (S) is not particularly limited, and the base material (S) may be made into a desired shape such as a plate shape (substrate) or a spherical shape as appropriate.

The procedure of applying the composition is exemplified by a spin coating process, and the like.

Heating Step

In this step, the coating film formed by the applying step is heated. Accordingly, formation of a bond between the metal atom (M) in/on the surface layer of the base material (S) and the group (X) of the polymer (A) in the composition is accelerated.

Means for the heating may be, for example, an oven, a hot plate, or the like. The lower limit of the temperature of the heating is preferably 80° C., more preferably 100° C., and still more preferably 130° C. The upper limit of the temperature of the heating is preferably 400° C., more preferably 300° C., and still more preferably 200° C. The lower limit of the time period of the heating is preferably 10 sec, more preferably 1 min, and still more preferably 2 min. The upper limit of the time period of the heating is preferably 120 min, more preferably 10 min, and still more preferably 5 min.

An average thickness of the film to be formed may be adjusted to a desired value by appropriately selecting the type and concentration of the polymer (A) in the composition, and conditions in the heating step such as the temperature of the heating and the time period of the heating. The lower limit of the average thickness of the film is preferably 0.1 nm, more preferably 1 nm, and still more preferably 3 nm. The upper limit of the average thickness is, for example, 20 nm. The average thickness of the film is a value measured using a spectroscopic ellipsometer ("M2000D" available from J. A. WOOLLAM Co.).

Rinsing Step

In this step, a portion formed on the region (II) of the coating film after the heating step is removed with a rinse agent. Accordingly, a portion, which includes the polymer (A) not being bonded to the metal atom (M), of the coating film after the heating step is removed, whereby the base material (S) having a portion of the region (I) being chemically modified in a selective manner is obtained.

The rinse agent used is typically an organic solvent, and for example, a polyhydric alcohol partial ether carboxylate solvent such as propylene glycol monomethyl ether acetate, a monohydric alcohol solvent such as isopropanol, or the like may be used.

In the aforementioned manner, a film superior in heat resistance can be selectively formed on the region (I) containing the metal atom (M) in/on the surface layer of the base material (S). The base material thus obtained may be processed by carrying out, for example, the following depositing step.

Depositing Step

In this step, a pattern is deposited on the surface of the base material (S) after the rinsing step by the CVD process or ALD process. Accordingly, a metal oxide pattern can be selectively formed on the region (II) not chemically modified by the polymer (A). According to the method of producing a substrate, by forming the film superior in heat resistance by using the composition described above, ALD tolerance can be further enhanced, and as a result, the metal oxide pattern can be formed on the region (II) in a further regionally selective manner.

Removing Step

In this step, a removing liquid is brought into contact with the film formed by the heating step. Accordingly, the film formed can be removed by wet detachment, in a convenient manner with influences on the base material (S) being diminished.

The removing liquid is preferably a liquid containing an acid or a liquid containing a base. Examples of the acid include: inorganic acids such as hydrochloric acid, sulfuric acid, nitric acid, and hydrofluoric acid; carboxylic acids such as acetic acid, citric acid, oxalic acid, maleic acid, isobutyric acid, and 2-ethylhexanoic acid; and the like. Of these, the carboxylic acids are preferred, and acetic acid or citric acid is more preferred. Examples of the base include sodium hydroxide, potassium hydroxide, sodium carbonate, sodium silicate, sodium metasilicate, ammonia, ethylamine, n-propylamine, diethylamine, di-n-propylamine, triethylamine, methyldiethylamine, dimethylethanolamine, triethanolamine, and the like. Of these, ammonia or triethylamine is preferred.

Alternatively, the removing liquid is also exemplified by an aqueous ammonium hydroxide-hydrogen peroxide solution (SC-1 washing liquid), an aqueous hydrochloric acid-hydrogen peroxide solution (SC-2 washing liquid), and the like.

The solvent of the removing liquid preferably contains water as a principal component. The lower limit of a proportion of water in the solvent is preferably 50% by mass, more preferably 90% by mass, and still more preferably 99% by mass. The proportion may be 100% by mass.

The lower limit of a concentration of the acid in the liquid containing the acid is preferably 0.1% by mass, more preferably 1% by mass, and still more preferably 3% by mass. The upper limit of the concentration is, for example, 100% by mass, more preferably 90% by mass, and still more preferably 50% by mass.

Polymer

The polymer of the still another embodiment of the present invention has at least one type of group selected from the set consisting of: a group including at least two cyano groups; a group including —$B(OR)_2$; a group including —$PO(OR)_2$; and a group including —$P(OR)_2$, at an end of a main chain or at an end of a side chain thereof (wherein, each R independently represents a hydrogen atom or a monovalent hydrocarbon group having 1 to 10 carbon atoms).

The polymer enables, through use as the component in the composition of the one embodiment of the present invention as described above, regionally selective forming of a film which is wet detachable, on a surface of a base material containing a metal atom in/on at least a part of a surface layer thereof, the film being capable of achieving superior blocking performance against metal oxide formation by an ALD process or a CVD process.

The polymer is described as the polymer (A) in the composition of the one embodiment described above.

EXAMPLES

Hereinafter, the present invention is explained in detail by way of Examples, but the present invention is not in any way limited to these Examples. Measuring methods for physical property values are each shown below.

Mw and Mn

The Mw and the Mn of the polymer were determined by gel permeation chromatography (GPC) using GPC columns (Tosoh Corporation; "G2000 HXL"×2, "G3000 HXL"×1 and "G4000 HXL"×1) under the following conditions:
eluent: tetrahydrofuran (FUJIFILM Wako Pure Chemical Corporation);
flow rate: 1.0 mL/min;
sample concentration: 1.0% by mass;
amount of sample injected: 100 μL;
column temperature: 40° C.;
detector: differential refractometer; and
standard substance: mono-dispersed polystyrene.

Synthesis of Polymer (A)

Synthesis Example 1: Synthesis of Polymer (A-1) (PS-ω-CN)

After a 500-mL flask as a reaction vessel was dried under reduced pressure, 120 g of tetrahydrofuran (THF) which had been subjected to a dehydrating treatment by distillation in a nitrogen atmosphere was charged thereinto and cooled to −78° C. Next, 2.38 mL of a 1 N cyclohexane solution of sec-butyllithium (sec-BuLi) was charged into this THF, and then 13.3 mL of styrene, which had been subjected to adsorptive filtration through silica gel and to a dehydrating treatment by distillation, was charged by dropwise addition over 30 min, while the internal temperature of the reaction mixture was carefully controlled so as not to be −60° C. or greater. After completion of the dropwise addition, the mixture was stirred for 30 min. Thereafter, 0.19 mL of 3-bromopropionitrile was charged to conduct a terminating reaction of the polymerization end. The temperature of the reaction mixture was elevated to room temperature, and a resulting reaction mixture was concentrated and then replacement with methyl isobutyl ketone (MIBK) was allowed. To a solution thus obtained, 1,000 g of a 2% by mass aqueous oxalic acid solution was charged, a resultant mixture was stirred and left to stand still, and then an aqueous underlayer was removed. This operation was repeated three times to remove a metal salt. Thereafter, 1,000 g of ultrapure water was charged, a resultant mixture was stirred, and then an aqueous underlayer was removed. After this operation was repeated three times to remove oxalic acid, a solution thus obtained was concentrated and then dropped into 500 g of methanol to precipitate a polymer, and a solid was collected on a Buchner funnel. The solid was dried at 60° C. under reduced pressure, whereby 11.9 g of a white polymer (hereinafter, may be also referred to as "polymer (A-1)" or "PS-ω-CN") represented by the following formula (A-1) was obtained. With regard to the polymer (A-1), the Mw was 6,000, the Mn was 5,600, and the Mw/Mn was 1.08.

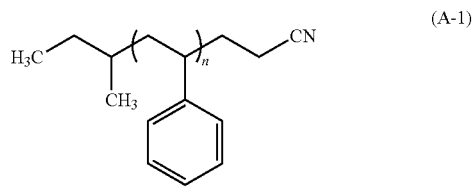

(A-1)

Synthesis Example 2: Synthesis of Polymer (A-2) (PS-ω-PhBOH)

After a 500-mL flask as a reaction vessel was dried under reduced pressure, 120 g of THF which had been subjected to a dehydrating treatment by distillation in a nitrogen atmosphere was charged thereinto and cooled to −78° C. Next, 2.30 mL of a 1 N cyclohexane solution of sec-BuLi was charged into this THF, and then 13.3 mL of styrene, which had been subjected to adsorptive filtration through silica gel and to a dehydrating treatment by distillation, was charged by dropwise addition over 30 min, while the internal temperature of the reaction mixture was carefully controlled so as not to be −60° C. or greater. After completion of the dropwise addition, the mixture was stirred for 30 min. Then, thereto were added 0.72 g of 2,4,6-triphenylboroxine and 1 mL of methanol to conduct a terminating reaction of the polymerization end. The temperature of the reaction mixture was elevated to room temperature, and a resulting reaction mixture was concentrated and then replacement with MIBK was allowed. To a solution thus obtained, 1,000 g of a 2% by mass aqueous oxalic acid solution was charged, a resultant mixture was stirred and left to stand still, and then an aqueous underlayer was removed. This operation was repeated three times. Thereafter, 1,000 g of ultrapure water was charged, a resultant mixture was stirred, and then an aqueous underlayer was removed. After this operation was repeated three times, a solution thus obtained was concentrated and then dropped into 500 g of methanol to precipitate a polymer, and a solid was collected on a Buchner funnel. The solid was dried at 60° C. under reduced pressure, whereby 12.1 g of a white polymer (hereinafter, may be also referred to as "polymer (A-2)" or "PS-ω-PhBOH") represented by the following formula (A-2) was obtained. With regard to the polymer (A-2), the Mw was 5,600, the Mn was 5,300, and the Mw/Mn was 1.06.

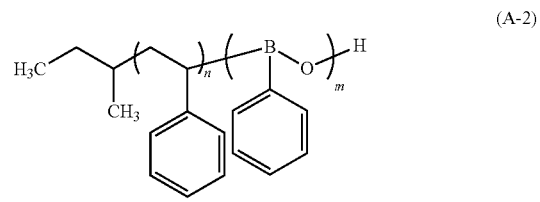

(A-2)

Synthesis Example 3: Synthesis of Polymer (A-3)
(PS-ω-(CN)$_2$)

After a 500-mL flask as a reaction vessel was dried under reduced pressure, 120 g of THF which had been subjected to a dehydrating treatment by distillation in a nitrogen atmosphere was charged thereinto and cooled to −78° C. Next, 2.38 mL of a 1 N cyclohexane solution of sec-BuLi was charged into this THF, and then 13.3 mL of styrene, which had been subjected to adsorptive filtration through silica gel and to a dehydrating treatment by distillation, was charged by dropwise addition over 30 min, while the internal temperature of the reaction mixture was carefully controlled so as not to be −60° C. or greater. After completion of the dropwise addition, the mixture was stirred for 30 min. Then, thereto was added 0.18 mL of N,N-dimethylformamide to conduct a terminating reaction of the polymerization end. The temperature of the reaction mixture was elevated to room temperature, and a resulting reaction mixture was concentrated and then replacement with MIBK was allowed. To a solution thus obtained, 1,000 g of a 2% aqueous oxalic acid solution was charged, a resultant mixture was stirred and left to stand still, and then an aqueous underlayer was removed. This operation was repeated three times. Thereafter, 1,000 g of ultrapure water was charged, a resultant mixture was stirred, and then an aqueous underlayer was removed. After this operation was repeated three times, a solution thus obtained was concentrated and then dropped into 500 g of methanol to precipitate a polymer, and a solid was collected on a Buchner funnel. The solid was dried at 60° C. under reduced pressure, whereby 11.9 g of a white polymer was obtained. The polymer had an Mw of 5,000, the Mn was 4,800, and the Mw/Mn was 1.04.

Next, 10.0 g of this polymer was dissolved in 40 g of toluene, and thereto were added 0.21 g of malononitrile, 0.25 g of ammonium acetate, and 0.038 g of acetic acid. The mixture was heated to reflux in a nitrogen atmosphere for 4 hrs. The temperature of the reaction mixture was elevated to room temperature, and a resulting reaction mixture was concentrated and then replacement with MIBK was allowed. To a solution thus obtained, 500 g of a 2% by mass aqueous sodium bicarbonate solution was charged, a resultant mixture was stirred and left to stand still, and then an aqueous underlayer was removed. This operation was repeated three times. Thereafter, 1,000 g of ultrapure water was charged, a resultant mixture was stirred, and then an aqueous underlayer was removed. After this operation was repeated three times, a solution thus obtained was concentrated and then dropped into 500 g of methanol to precipitate a polymer, and a solid was collected on a Buchner funnel. The solid was dried at 60° C. under reduced pressure, whereby 9.8 g of a white polymer (hereinafter, may be also referred to as "polymer (A-3)" or "PS-ω-(CN)$_2$") represented by the following formula (A-3) was obtained. With regard to the polymer (A-3), the Mw was 5,300, the Mn was 5,100, and the Mw/Mn was 1.04.

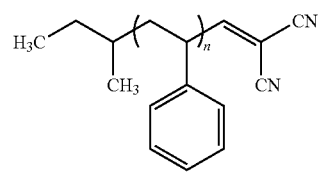

(A-3)

Synthesis Example 4: Synthesis of Polymer (A-4)
(PS-ω-B(OH)$_2$)

After a 500-mL flask as a reaction vessel was dried under reduced pressure, 120 g of THF which had been subjected to a dehydrating treatment by distillation in a nitrogen atmosphere was charged thereinto and cooled to −78° C. Subsequently, 2.30 mL of a 1 N cyclohexane solution of sec-BuLi was charged into this THF, and thereafter 13.3 mL of styrene, which had been subjected to adsorptive filtration through silica gel and to a dehydrating treatment by distillation, was charged by dropwise addition over 30 min, while the internal temperature of the reaction mixture was carefully controlled so as not to be −60° C. or greater. After completion of the dropwise addition, the mixture was stirred for 30 min. Then, thereto was charged 0.47 mL of diisopropyl bromoethylborate to conduct a terminating reaction of the polymerization end. The temperature of the reaction mixture was elevated to room temperature, and a resulting reaction mixture was concentrated and then replacement with MIBK was allowed. To a solution thus obtained, 1,000 g of a 2% aqueous oxalic acid solution was charged, a resultant mixture was stirred and left to stand still, and then an aqueous underlayer was removed. This operation was repeated three times. Thereafter, 1,000 g of ultrapure water was charged, a resultant mixture was stirred, and then an aqueous underlayer was removed. After this operation was repeated three times, a solution thus obtained was concentrated and then dropped into 500 g of methanol to precipitate a polymer, and a solid was collected on a Buchner funnel. The solid was dried at 60° C. under reduced pressure, whereby 11.7 g of a white polymer (hereinafter, may be also referred to as "polymer (A-4)" or "PS-ω-B(OH)$_2$") represented by the following formula (A-4) was obtained. With regard to the polymer (A-4), the Mw was 5,100, the Mn was 4,800, and the Mw/Mn was 1.04.

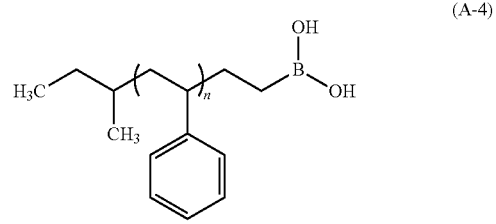

(A-4)

Synthesis Example 5: Synthesis of Polymer (A-5)
(PS-ω-PO$_3$Et$_2$)

After a 500-mL flask as a reaction vessel was dried under reduced pressure, 120 g of THF which had been subjected to a dehydrating treatment by distillation in a nitrogen atmosphere was charged thereinto and cooled to −78° C. Subsequently, 2.30 mL of a 1 N cyclohexane solution of sec-BuLi was charged into this THF, and thereafter 13.3 mL of styrene, which had been subjected to adsorptive filtration through silica gel and to a dehydrating treatment by distillation, was charged by dropwise addition over 30 min, while the internal temperature of the reaction mixture was carefully controlled so as not to be −60° C. or greater. After completion of the dropwise addition, the mixture was stirred for 30 min. Then, thereto was charged 0.33 mL of diethyl chlorophosphate to conduct a terminating reaction of the polymerization end. The temperature of the reaction mixture was elevated to room temperature, and a resulting reaction mixture was concentrated and then replacement with MIBK was allowed. Thereafter, 1,000 g of a 2% aqueous oxalic acid solution was charged, a resultant mixture was stirred and left to stand still, and then an aqueous underlayer was removed. This operation was repeated three times. Thereafter, 1,000 g of ultrapure water was charged, a resultant mixture was stirred, and then an aqueous underlayer was removed. After this operation was repeated three times, a solution thus obtained was concentrated and then dropped into 500 g of methanol to precipitate a polymer, and a solid was collected on a Buchner funnel. The solid was dried at 60° C. under reduced pressure, whereby 11.5 g of a white polymer (hereinafter, may be also referred to as "polymer (A-5)" or "PS-ω-PO$_3$Et$_2$") represented by the following formula (A-5) was obtained. With regard to the polymer (A-5), the Mw was 5,100, the Mn was 4,900, and the Mw/Mn was 1.04.

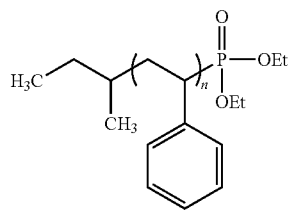
(A-5)

Synthesis Example 6: Synthesis of Polymer (A-6) (PS-ω-PO$_3$H$_2$)

To 10.0 g of the polymer (A-5) obtained in Synthesis Example 5 were added 0.81 g of triethylamine, 4 g of propylene glycol monomethyl ether, and 40 g of propylene glycol monomethyl ether acetate, and the mixture was heated with stirring at 80° C. in a nitrogen atmosphere. The temperature of the reaction mixture was elevated to room temperature, and a resulting reaction mixture was concentrated and then replacement with MIBK was allowed. Thereafter, 500 g of a 2% aqueous oxalic acid solution was charged, a resultant mixture was stirred and left to stand still, and then an aqueous underlayer was removed. This operation was repeated three times. Thereafter, 1,000 g of ultrapure water was charged, a resultant mixture was stirred, and then an aqueous underlayer was removed. After this operation was repeated three times, a solution thus obtained was concentrated and then dropped into 500 g of methanol to precipitate a polymer, and a solid was collected on a Buchner funnel. The solid was dried at 60° C. under reduced pressure, whereby 9.2 g of a white polymer (hereinafter, may be also referred to as "polymer (A-6)" or "PS-ω-PO$_3$H$_2$") represented by the following formula (A-6) was obtained. With regard to the polymer (A-6), the Mw was 5,100, the Mn was 4,800, and the Mw/Mn was 1.06.

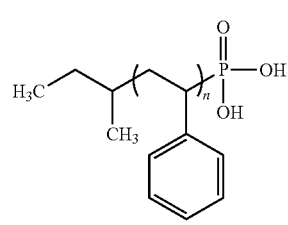
(A-6)

Synthesis Example 7: Synthesis of Polymer (A-7) (PS-ω-CH(CN)$_2$)

After 5 g of the polymer (A-3) obtained in Synthesis Example 3 was dissolved in 40 g of toluene, 0.15 g of sodium borohydride was added thereto. The mixture was stirred at normal temperature for 30 min, until foaming ceased. A thus resulting reaction solution was washed with 20 g of a 1 N aqueous hydrochloric acid solution. After this operation was conducted three times, the organic layer was recovered, concentrated, and then dropped into 200 g of methanol to precipitate a polymer. A solid precipitated was collected on a Buchner funnel and this polymer was dried at 60° C. under reduced pressure, whereby 4.9 g of a white polymer (hereinafter, may be also referred to as "polymer (A-7)" or "PS-ω-CH(CN)$_2$") represented by the following formula (A-7) was obtained. With regard to the polymer (A-7), the Mw was 5,350, the Mn was 5,140, and the Mw/Mn was 1.04.

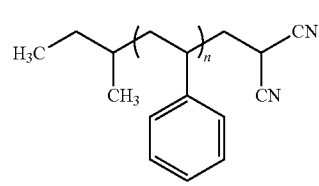
(A-7)

Preparation of Composition

The solvent (B) used in preparing the compositions is shown below.

(B) Solvent

B-1: Propylene Glycol Monomethyl Ether Acetate (PGMEA)

Comparative Example 1

The composition (S-1) was prepared by: adding 98.7 g of (B-1) as the solvent (B) to 1.30 g of (A-1) as the polymer (A); stirring a resultant mixture; and then filtering a thus resulting solution through a high density polyethylene filter having fine pores of 0.45 μm.

Comparative Example 2, and Examples 1 to 4 and 16

Compositions (S-2) to (S-7) were prepared in a similar manner to Comparative Example 1 except that for each component, the type and the amount shown in Table 1 below were used.

TABLE 1

| Blend amount (g) | | Comparative Example 1 | Comparative Example 2 | Example 1 | Example 2 | Example 3 | Example 4 | Example 16 |
|---|---|---|---|---|---|---|---|---|
| Composition | | S-1 | S-2 | S-3 | S-4 | S-5 | S-6 | S-7 |
| (A) Polymer | A-1 | 1.30 | | | | | | |
| | A-2 | | 1.30 | | | | | |
| | A-3 | | | 1.30 | | | | |
| | A-4 | | | | 1.30 | | | |
| | A-5 | | | | | 1.30 | | |
| | A-6 | | | | | | 1.30 | |
| | A-7 | | | | | | | 1.30 |
| (B) Solvent | B-1 | 98.7 | 98.7 | 98.7 | 98.7 | 98.7 | 98.7 | 98.7 |
| Solid content concentration (% by mass) | | 1.30 | 1.30 | 1.30 | 1.30 | 1.30 | 1.30 | 1.30 |

Forming of Film

Comparative Example 3

An 8-inch copper substrate was cut into pieces of 3 cm×3 cm, and the composition (S-1) prepared described above was spin-coated at 1,500 rpm for 20 sec by using a spin coater ("MS-B300" available from Mikasa Co., Ltd.) and thereafter baked at 150° C. for 180 sec. Subsequently, an unadsorbed film was removed by using propylene glycol monomethyl ether acetate.

Comparative Examples 4 to 8, and Examples 4 to 15, and 17 to 19

Films were formed in a similar manner to Comparative Example 3 except that the substrates (copper substrate, cobalt substrate, tungsten substrate, or Si oxide substrate) and the compositions shown in Table 3 below were used.
Evaluation of Regional Selectivity in Film Forming
Measurement of Contact Angle Value of Surface With respect to the substrates onto which the aforementioned compositions had been each applied and baked, contact angle values of the surfaces were measured using a contact angle meter ("DropMaster DM-501" available from Kyowa Interface Science Co., Ltd.). Measurements of the contact angle values are shown together in Table 3 below.
Measurement of Average Thickness of Film and Polymer Density The average thickness (unit: nm) of the film formed as described above was measured by using a spectroscopic ellipsometer ("M2000D" available from J. A. WOOLLAM Co.). Furthermore, the arrangement density σ (unit: chains/nm$^2$) of the polymer (A) was calculated by the following equation.

$$\sigma = d \times L \times NA \times 10^{-21}/Mn$$

In the above equation: d represents the density (unit: g/cm$^3$) of the polymer (A); L represents the average thickness (unit: nm) of the film; NA represents Avogadro's number; and Mn represents the number average molecular weight of the polymer (A).

The average thickness L of the film and the arrangement density σ of the polymer (A) are shown together in Table 3 below.
Evaluation of Wet Detachability of Film An 8-inch substrate (copper substrate, cobalt substrate, tungsten substrate, or Si oxide substrate) was cut into pieces of 3 cm×3 cm, and each composition shown in Table 3 below was spin-coated at 1,500 rpm for 20 sec by using a spin coater ("MS-B300" available from Mikasa Co., Ltd.) and thereafter baked at 150° C. for 180 sec. Subsequently, an unadsorbed film was removed by using propylene glycol monomethyl ether acetate. Then the contact angle value of the surface was measured using the aforementioned contact angle meter. After immersion for 3 min in a dish into which acetic acid had been placed, a mixed solution of propylene glycol monomethyl ether acetate/ethyl lactate (8/2 (mass ratio)) was used for rinsing, and the contact angle value of the surface of the substrate was measured using the contact angle meter. A decreased contact angle value is shown in Table 3 below. From the contact angle value being thus decreased, detachment of the film was confirmed.
Evaluation of Metal Oxide Blocking In order to evaluate a state of film forming on the surface of each substrate onto which the composition had been applied and baked as in the above "Forming of Film" section, an evaluation of metal oxide blocking was made in which a degree of inhibition of oxide layer forming by ALD was measured.

Evaluation of ALD Tolerance

An evaluation of metal oxide blocking was made by using Cambridge Nanotech FIJI at Stanford University, under conditions shown in Table 2 below. As a precursor, tetrakis(dimethylamino)hafnium was used, and water was used as a catalytic promoter. With 47 cycles being fixed as ALD cycles, the presence/absence of oxide layer forming was ascertained on the substrate onto which the composition had been applied and baked.

TABLE 2

| Parameter | Value |
|---|---|
| Film type | ALD HfO$_2$ |
| Chamber | Cambridge Nanotech FIJI |
| Stage temp. | 200° C. |
| Hf precursor | Tetrakis(dimethylamino)hafnium |
| Co-reactant | H$_2$O |
| Recipe timing | 0.3 s Hf/15 s purge/0.06 s H$_2$O/23 s purge |
| # of cycles | 47 cycles |
| Thickness on Si | 5.4 nm or 2.8 nm (by ellipsometry) |
| Loading | Let stage cool for 15 mins before loading |
| Queue Time | <3 hours from pick-up |

Evaluation by XPS (X-Ray Photoelectron Spectroscopy)
XPS Evaluation

With regard to a Hf component on the coating film after the evaluation of ALD tolerance, quantitative determination was performed by an ESCA (Electron Spectroscopy for Chemical Analysis). According to the ESCA, with "Quantum 2000" available from ULVAC, Inc., the Hf component, derived by eliminating coating film components and substrate components from 100 μmφ conditions, was quantitatively determined for Hf4f, and then a percentage was calculated. In this respect, a greater "ALD tolerance" value indicates the film having superior Hf blocking performance.

blocking performance against metal oxide formation by an ALD process or a CVD process. The polymer of the embodiment of the present invention can be suitably used as a polymer component of the composition. Therefore, the composition, the method of producing a substrate, and the polymer can be suitably used for working processes of semiconductor devices, and the like, in which microfabrication is expected to be further in progress hereafter.

Obviously, numerous modifications and variations of the present invention are possible in light of the above teachings. It is therefore to be understood that within the scope of

TABLE 3

| Copper substrate | | Sample | Selectivity | | Average thickness (nm) | Arrangement density σ (chains/cm$^2$) | Wet detachability | ALD tolerance |
|---|---|---|---|---|---|---|---|---|
| | | | Copper | Si oxide | | | | |
| | Composition | Control | 71 | 36 | — | — | — | — |
| Comparative Example 3 | S-1 | PS-ω-CN | 88 | 41 | 4.1 | 0.45 | 39 | 72% |
| Comparative Example 4 | S-2 | PS-ω-PhBOH | 88 | 38 | 3.9 | 0.46 | 38 | 68% |
| Example 4 | S-3 | PS-ω-(CN)$_2$ | 91 | 40 | 5.2 | 0.63 | 40 | 86% |
| Example 5 | S-4 | PS-ω-B(OH)$_2$ | 91 | 40 | 5.1 | 0.66 | 38 | 84% |
| Example 6 | S-5 | PS-ω-PO$_3$Et$_2$ | 89 | 41 | 4.8 | 0.61 | 37 | 86% |
| Example 7 | S-6 | PS-ω-PO$_3$H$_2$ | 91 | 41 | 5.3 | 0.68 | 39 | 89% |
| Example 17 | S-7 | PS-ω-CH(CN)$_2$ | 91 | 35 | 5.2 | 0.63 | 39 | 90% |

| Cobalt substrate | | Sample | Selectivity | | Average thickness (nm) | Arrangement density σ (chains/cm$^2$) | Wet detachability | ALD tolerance |
|---|---|---|---|---|---|---|---|---|
| | | | Cobalt | Si oxide | | | | |
| | Composition | Control | 64 | 36 | — | — | — | — |
| Comparative Example 5 | S-1 | PS-ω-CN | 88 | 41 | 3.8 | 0.42 | 39 | 68% |
| Comparative Example 6 | S-2 | PS-ω-PhBOH | 88 | 38 | 3.3 | 0.39 | 38 | 69% |
| Example 8 | S-3 | PS-ω-(CN)$_2$ | 91 | 41 | 4.9 | 0.60 | 40 | 88% |
| Example 9 | S-4 | PS-ω-B(OH)$_2$ | 91 | 39 | 4.8 | 0.62 | 38 | 89% |
| Example 10 | S-5 | PS-ω-PO$_3$Et$_2$ | 89 | 39 | 4.6 | 0.58 | 38 | 90% |
| Example 11 | S-6 | PS-ω-PO$_3$H$_2$ | 91 | 41 | 5.2 | 0.67 | 39 | 91% |
| Example 18 | S-7 | PS-ω-CH(CN)$_2$ | 91 | 37 | 5.2 | 0.63 | 38 | 89% |

| Tungsten substrate | | Sample | Selectivity | | Average thickness (nm) | Arrangement density σ (chains/cm$^2$) | Wet detachability | ALD tolerance |
|---|---|---|---|---|---|---|---|---|
| | | | Tungsten | Si oxide | | | | |
| | Composition | Control | 63 | 36 | — | — | — | — |
| Comparative Example 7 | S-1 | PS-ω-CN | 89 | 40 | 3.7 | 0.41 | 39 | 71% |
| Comparative Example 8 | S-2 | PS-ω-PhBOH | 88 | 38 | 3.6 | 0.42 | 41 | 69% |
| Example 12 | S-3 | PS-ω-(CN)$_2$ | 91 | 39 | 5.3 | 0.68 | 38 | 88% |
| Example 13 | S-4 | PS-ω-B(OH)$_2$ | 90 | 40 | 5.2 | 0.67 | 38 | 91% |
| Example 14 | S-5 | PS-ω-PO$_3$Et$_2$ | 89 | 40 | 4.7 | 0.59 | 38 | 90% |
| Example 15 | S-6 | PS-ω-PO$_3$H$_2$ | 91 | 40 | 5.4 | 0.70 | 40 | 93% |
| Example 19 | S-7 | PS-ω-CH(CN)$_2$ | 91 | 36 | 5.3 | 0.64 | 39 | 92% |

From the results shown in Table 3, it is revealed that the compositions of the Examples enable forming of a film which is wet detachable, in a regionally selective manner with high density, on a surface of a base material containing a metal atom in/on at least a part of a surface layer thereof, the film being capable of achieving superior blocking performance against metal oxide formation by an ALD process.

The composition and the method of producing a substrate of the embodiments of the present invention enable forming of a film which is wet detachable, in a regionally selective manner with high density, on a surface of a base material containing a metal atom in/on at least a part of a surface layer thereof, the film being capable of achieving superior the appended claims, the invention may be practiced otherwise than as specifically described herein.

What is claimed is:

1. A method of producing a substrate, the method comprising:
    applying a composition directly or indirectly on a base material to form a coating film; and
    heating the coating film,
    wherein:
    the base material comprises a surface layer which comprises:

a first region comprising a metal atom; and
a second region not comprising a metal atom;
the base material comprises a metal atom at least one of in or on at least a part of the surface layer; and
the composition comprises:
a polymer comprising a group (X) which is at least one selected from the group consisting of: a group comprising at least two cyano groups; a group comprising —B(OR)$_2$; a group comprising —PO(OR)$_2$; and a group comprising —P(OR)$_2$, wherein, each R independently represents a hydrogen atom or a monovalent hydrocarbon group having 1 to 10 carbon atoms; and
a solvent.

2. The method according to claim 1, wherein the metal atom constitutes a metal simple substance, an alloy, an electrically conductive nitride, or a silicide.

3. The method according to claim 1, wherein the metal atom is an atom of copper, iron, zinc, cobalt, aluminum, titanium, tin, tungsten, zirconium, tantalum, germanium, molybdenum, ruthenium, gold, silver, platinum, palladium, or nickel.

4. The method according to claim 1, further comprising after the heating,
bringing a removing liquid into contact with the coating film.

5. The method according to claim 4, wherein the removing liquid comprises at least one selected from the group consisting of an acid and a base.

6. The method according to claim 1, further comprising applying a rinse agent on the coating film after the heating to remove the coating film formed on the second region, while keeping the coating film formed on the first region remained.

7. The method according to claim 6, after the applying of the rinse agent, further comprising depositing a metal oxide selectively on the second region to form a metal oxide pattern.

8. The method according to claim 6, after the applying of the rinse agent, bringing a removing liquid into contact with the coating film.

9. The method according to claim 7, after the applying of the rinse agent, bringing a removing liquid into contact with the coating film.

* * * * *